Oct. 17, 1961    J. BERNRADER    3,004,481
PHOTOGRAPHIC CAMERA WITH ELECTRIC EXPOSURE REGULATOR
Filed June 27, 1958    2 Sheets-Sheet 1
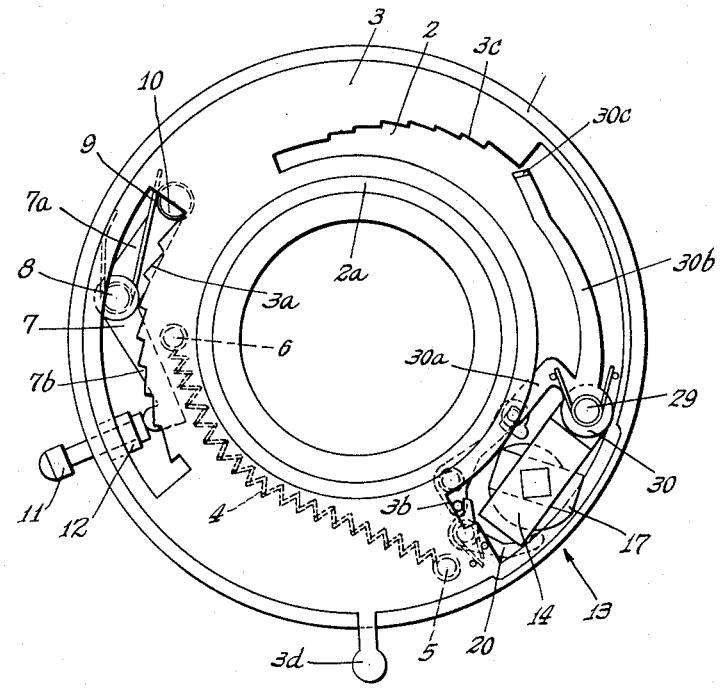
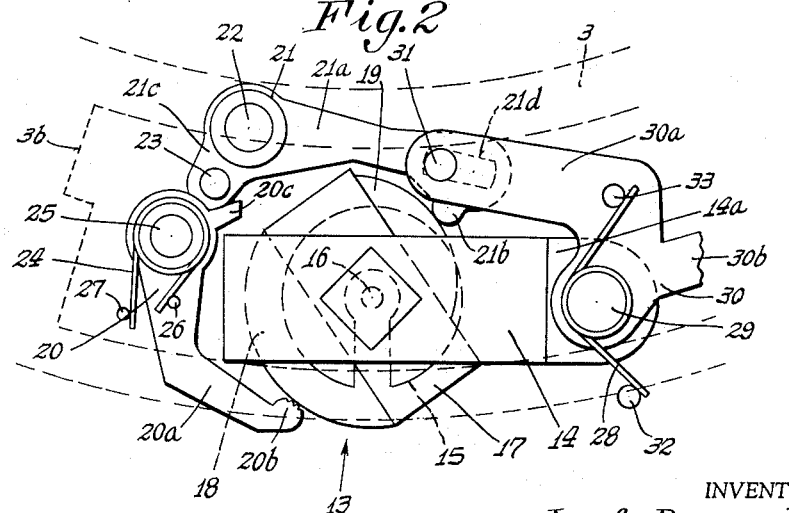
INVENTOR.
Josef Bernrader
BY
Munn, Liddy, Daniels & March
ATTORNEYS Oct. 17, 1961   J. BERNRADER   3,004,481
PHOTOGRAPHIC CAMERA WITH ELECTRIC EXPOSURE REGULATOR
Filed June 27, 1958   2 Sheets-Sheet 2

INVENTOR.
Josef Bernrader
BY
Munn, Liddy, Daniels & March
ATTORNEYS

United States Patent Office 3,004,481
Patented Oct. 17, 1961

3,004,481
PHOTOGRAPHIC CAMERA WITH ELECTRIC EXPOSURE REGULATOR
Josef Bernrader, Nurnberg, Germany, assignor to Alfred Gauthier G.m.b.H., Calmbach (Enz), Germany, a corporation of Germany
Filed June 27, 1958, Ser. No. 745,159
Claims priority, application Germany July 2, 1957
7 Claims. (Cl. 95—10)

This invention relates to photographic cameras of the type which employ electric exposure regulators, and more particularly to the means in such cameras by which the response of the measuring device of the regulator is utilized in effecting the proper adjustment of the camera setting members.

It has been proposed in the past, in a camera of the above type, to provide on the movable part of the measuring device of the exposure regulator a pair of cams which are then actuated as the measuring device is made to respond to the electric current of a photosensitive element. For cooperation with such cams there was provided a pair of scissor-type levers, said levers being held out of engagement with the cams during the time that the measuring device was responding to the existing light conditions, thereby to allow the movable part of such device to have freedom of movement and to be fully responsive to the light conditions. The pair of follower levers and the cam surfaces on the movable part constituted together the tracing device, and the action was characterized by both said levers simultaneously engaging and resting against the opposed cam surfaces. With this prior organization the forces imposed by the levers acted in opposition to each other, thereby resulting in a minimum resultant force on the bearings of the movable part of the measuring device. Such bearings were therefor loaded to a much lesser extent, while at the same time the opposed forces imposed by the levers tended to more securely hold the movable part of the measuring device in its adjusted position as initially determined by the existing light conditions. In obtaining these advantages it was found to be essential to maintain relatively close tolerances with regard to the relative movements of the levers and the positioning of the same with respect to the axis or spindle of the movable part of the measuring device. These increased requirements in accuracy, involved in the manufacture and assembly of the parts, resulted in an increased cost which in some circumstances is considered to be undesirable.

An object of the present invention is to provide a novel and improved photographic camera structure having an electrical exposure regulator, which structure is so arranged and constituted that it has the advantages of the prior construction above-outlined, while at the same time there is effected an economy in the manufacturing and assembly cost as regards the close tolerances and high accuracy previously found to be necessary, by which the production cost of the camera structure may be appreciably reduced.

In accomplishing the above object, in accordance with the invention, I provide on the movable part of the measuring device of the electric exposure regulator a single cam means or part for tracing purposes, and additionally provide on such movable part of the measuring device a novel brake means or brake surface adapted to fix or hold the movable part in any of its various adjusted positions. The said cam part or surface and the brake part or surface are adapted to cooperate with a pair of scissor-type levers and engage the latter, said levers being separable from such surfaces at the time that the light conditions are being taken into account, thereby to provide for free and unhampered shifting of the movable part of the measuring device to its proper adjusted position as it responds to the current of the photosensitive element of the regulator. I further provide a novel organization comprising coupling means between the levers to effect concurrent movement thereof, said coupling means being so arranged that it causes the lever associated with the brake surface to engage the same prior to engagement of the other or cam-follower lever with the cam surface as the said levers are concurrently moved toward such engagement. The construction and arrangement of the scissor-type pair of levers and the cam and brake surfaces carried by the said movable part are such that high accuracy and reliability of function can be obtained with relatively little expense. Also, there is still avoided the imposing of appreciable, uncompensated or unopposed forces on the movable part of the measuring device, which would unduly load the bearings thereof. This is accomplished by securely fixing or holding the movable part of the measuring device before the tracing operation involving the cam surface of such device is carried out, and in consequence during the tracing procedure and movable part will not undesirably change its position to alter the correct speed or other setting of the camera, nor will the tracing or cam-follower lever undesirably load the bearings of the movable member. I have found that the important requirement which is to be effected by the construction and arrangement of the pair of levers and the cam and brake surfaces is to couple the said levers to each other for concurrent movement in such a way that the breaking lever engages the brake surface of the movable part prior to engagement of the cam surface of such part by the other, cam follower or tracing lever. Such coupling of the levers, moreover, may be obtained in a most simple and effective manner. Also, as demonstrated by a practical execution of the invention, the various cooperative parts may be simply constructed with relatively large tolerances or deviations from specified dimensions without imposing a moment on the bearings of the movable part of the measuring device which would be great enough to constitute a disadvantage, and without resulting in an appreciable or impractical diminution in the working accuracy of the regulator.

A simple construction and arrangement of both levers, as well as effective and reliable cooperation and functioning of the various components of the device may be readily obtained by constituting the coupling means between the levers in the form of an abutting, spring-charged or -biased connection.

In accomplishing such abutting, spring-charged connection between the levers, and also to bias the levers into engagement with the associated cam and brake surfaces I provide a simple spring means acting on one of the levers, which tends to maintain the abutting surfaces of the levers in continuous engagement with each other. Such spring means at the same time may be utilized to bias the braking lever into engagement with the braking surface of the measuring device, and an additional spring means may be simply provided to bias the other, cam-follower or tracing lever into engagement with the tracing cam carried by the said movable part.

In addition to the said spring means, a further simplified construction of the device is had by constituting both levers as two-armed levers, one arm of each lever being adapted for engagement with the cam surface and brake surface of the movable part whereas the remaining arms of the levers constitute the coupling means by which the levers are connected to each other for concurrent movement.

For obtaining direct-acting and simple movements of the tracing and brake levers, and also for the purpose of maintaining at a uniform value the moment or load imposed on the bearings of the movable part of the measuring device whenever the braking lever is rendered operative, I have found it advantageous to constitute the said braking surface as a cylindrical surface having a center of curvature which coincides with the axis of turning of the movable part.

A reliable braking action of the movable part of the measuring device in any of its adjusted positions by means of the brake lever, and consequently a high accuracy in tracing and reliability are all obtained by constituting one of the braking surfaces so that it has a high coefficient of friction. This is accomplished, for example by making such surface rough or providing a fine knurling thereon.

In the accompanying drawings there is illustrated an embodiment of the invention, as incorporated in a photographic lens shutter construction.

FIGURE 1 is a front elevational view of a photographic lens shutter construction with the cover plate removed and with various details not pertinent to the invention omitted. The tracing (cam-follower) and brake levers as provided by the invention are shown as disengaged from the movable part of the electric measuring device.

FIG. 2 is an enlarged fragmentary front elevational view of the measuring device, and tracing (cam-follower) and brake levers associated therewith. The said levers are shown in their operative positions, engaged with the movable part of the measuring device.

Figure 3:
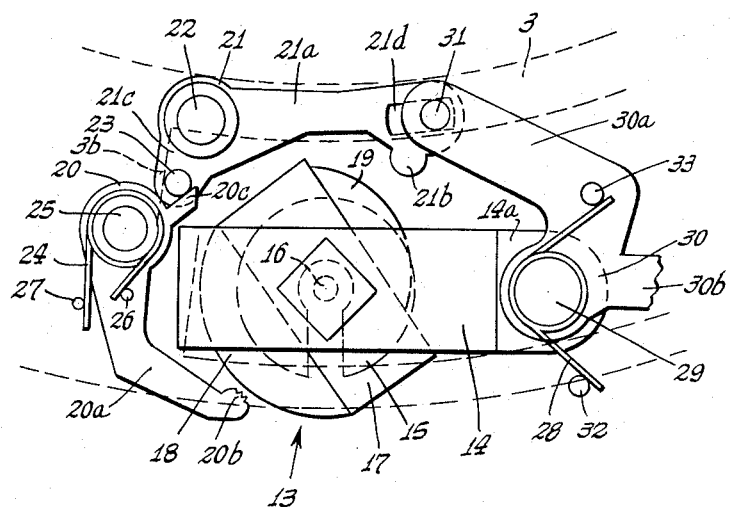
FIG. 3 is a view similar to that of FIG. 2 but showing the tracing (cam-follower) and brake levers in their inoperative or disengaged positions.

Referring first to FIG. 1, the housing of the photographic lens shutter construction is indicated by the numeral 1. The housing 1 has provided within it, in the well known manner, a shutter base plate 2 having the usual nozzle 2a. The nozzle 2a may constitute a bearing shoulder on which there is pivotally or rotatably mounted an exposure adjustment comprising a speed setting ring 3. As determined by the particular functions required of the shutter construction, the ring 3 may be constituted either as a speed setting ring, or else a diaphragm ring, or an exposure-value setting ring of the well known type. A helical extension spring 4 is provided, at one end affixed to a pin 5 rigid on the housing 1 and at the other end fastened to a pin 6 which is carried by the speed setting ring 3, thereby to bias the said ring in a counterclockwise direction and normally hold the ring in a starting position, as shown in FIG. 1.

For the purpose of determining different setting positions for the exposure adjustment or speed setting ring 3 a well-known detent device is provided, comprising notches 3a adapted to cooperate with a notch lever 7. The lever 7 is pivotally movable about an axis 8 fixed on the shutter base plate 2, and is under the action of a wire spring 9 which biases the lever in a clockwise direction, thereby to maintain a holding pin 10 carried by the lever in engagement with one of the notches 3a as the speed setting ring 3 is shifted for adjustment. As shown, the holding pin 10 is mounted on an arm 7a of the lever 7. To actuate the lever 7 for the purpose of disengaging the pin 10 from one of the notches 3a, there is provided a depressible plunger or pin 11 adapted to engage the other arm 7b of the lever, as is readily understood in the art. Thus, the lever 7 may be actuated from the exterior of the housing 1. The plunger 11 may conveniently have a bearing within a sleeve or bushing 12, as shown.

Within the housing 1 there is further provided an electric measuring device 13 which may be in the form of an electrical instrument movement. Such a movement is well known in the art, and is commonly referred to as a D'Arsonval movement. The measuring device or instrument movement 13 may be energized by current supplied from a photoelectric cell or equivalent photosensitive element (not shown herein) in a manner well understood in the art. The motivating coil 17 of the instrument movement 13 may be connected by a pair of wires or a single wire and ground connection (not shown) to the generating photocell, all as is well understood in the art. The measuring device or instrument movement 13 is of well known construction including a fixed carrier frame 14 mounting a fixed permanent magnet 15, the movable part of the instrument including a moving coil 17 carried by a spindle 16 which has bearings in the carrier frame 14.

In accordance with the present invention, the movable part of the measuring device 13 in addition to having the driving coil 17 is further provided with a braking part or locking part 18 and a tracing cam part 19, said parts being adapted for cooperation with a pair of scissor-type levers 20 and 21 respectively, which levers may be wholly disengaged from the parts 18 and 19 so that the movable part of the instrument movement or measuring device can have unhampered motion to enable it to respond in a sensitive manner to the energizing current from the photoelectric cell or equivalent device. The cam follower lever 21 and the cam part 19 together constitute the tracing means of the measuring device 13, whereas the lever 20 and the braking or locking part 18 constitute a fixing or braking means for holding the movable coil 17 in any of its various adjusted positions. Also, the levers 20 and 21 are coupled to each other for concurrent movement in such a manner that the cam follower or tracing lever 21 does not engage the associated cam surface of the cam part 19 until after the brake lever 20 has first engaged the braking part 18 and locked the movable coil 17 in its adjusted position.

In the illustrated embodiment of the invention, the levers 20 and 21 are pivotally carried by spindles 25 and 22 respectively, said spindles being conveniently connected with the carrier frame 14 of the measuring device. For cooperation with the cam part 19 and brake part 18, the levers 21 and 20 are provided with projections 21b and 20b respectively on the arms 21a and 20a of the levers. These projections constitute the portions of the levers which engage the cam surface provided by the part 19 and the brake surface provided by the part 18.

For the purpose of reliably locking the movable coil 17 in any of its various adjusted positions I provide a knurled surface on the projection 20b as clearly shown in FIGS. 2 and 3, said knurled surface being thus engageable with the braking surface of the part 18. In conjunction with such knurled surface or in place thereof, knurling may be provided on the braking surface of the part 18 as will be readily understood. In place of knurling, such surfaces may be otherwise prepared, as by roughening, graining and the like, to increase the coefficient of friction thereof.

The movements of the levers 20 and 21 can be correlated in a simple and effective manner to obtain the desired sequential functioning as above set forth, whereby the tracing lever 21 does not engage the cam 19 until after the brake lever 20 is made to engage the brake part or shoe 18. In the illustrated embodiment of the invention this is accomplished by connecting the levers to each other by an abutting connection and utilizing a spring biasing means. Such connection is often termed a connection "by power." With this type of connection there is insured a simple and uncomplicated construction of the actuation device, explained below in detail, by which the levers are disengaged from the respective parts 19, 18 of the movable system of the measuring device, to relieve such movable system of all hindrance whereby it may respond in a sensitive manner to the energy supplied by the photocell device.

As illustrated herein, the connection by power between the levers 20 and 21 is effected in a particularly simple way, by constituting the said levers as two-armed levers; also, those arms 20c and 21c of the said two-armed levers which are not involved in engagement with the parts 18, 19 are utilized to provide the said connection by power. For this purpose, there is provided on the arm 21c of the cam follower or tracing lever 21 a pin 23 which is disposed in the path of movement of the arm 20c of the fixing or braking lever 20. As shown in FIG. 2, when the levers 20 and 21 are in their operative positions, a certain distance or space is maintained between the pin 23 and the arm 20c of the brake lever. Considering the position of the movable coil 17 of the measuring device 13 at any one time, the distance or spacing between the pin 23 and arm 20c corresponds to the angular path of movement of the pin 23 and the lever 21 after the brake lever 20 has engaged the brake part 18 and come to rest, such movement of the pin 23 and lever 21 being terminated upon engagement between the projection 21b of the lever and the cam part or surface 19 of the movable system.

In further obtaining the connection by power between the levers 20 and 21, the biasing spring means utilized may be constituted as a wire spring 24, which biases the brake lever 20 in a counterclockwise direction, said spring being carried by the spindle 25 for the brake lever. It will be understood that the spring 24 continually tends to maintain the arm 20c of the lever 20 in engagement with the pin 23 of the lever 21, and such engagement is discontinued as the levers 20, 21 are made to be operative as shown in FIG. 2. One end of the spring 24 is engaged with a fixed pin 27, whereas the other end of the spring engages a pin 26 which is mounted on the arm 20a of the lever 20.

Aside from its function as constituting a part of the means for effecting a connection by power between the levers 20 and 21, the spring 24 also biases the brake lever 20 to normally urge the projection 20b thereof into engagement with the brake part or shoe 18, and accordingly it is not necessary to provide a separate or additional spring for this purpose. For the purpose of urging the cam follower or tracing lever 21 clockwise to effect engagement between the projection 21b thereof and the cam part 19, a spring 28 is provided, which also has a dual or double function. Details of such spring are given below.

In the illustrated embodiment of the invention the engagement of the levers 20, 21 with the movable part of the measuring device 13 and the disengagement of said levers from the movable part is made responsive to movement of the speed setting ring 3, said setting ring when in its starting position as shown in FIG. 1 effecting the disengagement of the levers whereby the movable part is free to respond in a sensitive manner to the energy supplied by the photocell or photosensitive element of the camera. In accomplishing this, the speed setting ring 3 is provided with a stop or shoulder 3b which is engageable with the pin 23 carried by the cam follower lever 21, as illustrated in FIGS. 1 and 3. In FIG. 3 the speed setting ring is indicated by broken lines, as well as the shoulder or stop 3b thereof. In FIG. 2 the stop 3b, also illustrated in broken outline, is shown disengaged from the pin 23, and in consequence of this the levers 20 and 21 are freed from the influence of the speed setting ring 3 and may be engaged with the movable part of the measuring device in response to the biasing means comprising the springs 24 and 28.

In accordance with the present invention the brake part 18 of the measuring device is constituted as a segment of a cylinder having a center of curvature coinciding with the axis of the spindle 16 for the movable coil 17. By such organization there results the advantage that the extent of movement of the lever 20 is always the same, regardless of the adjusted position of the movable coil 17 and the brake part 18. In consequence, the movements of the cam follower lever 21 and the brake lever 20 may be correlated to each other in a simple and effective manner.

Also, by such construction of the brake part 18, in accordance with the invention, the moment which is exerted on the bearing of the spindle 16 and on the brake part 18 is always in one direction, i.e. in a radial direction which is most effective in obtaining a reliable braking action to securely hold the movable coil 17 in any of its adjusted positions. By such organization the effect of the brake lever 20 on the supporting means, bearings, etc., of the measuring device coil 17 remains constant for all different adjusted positions of the coil. In consequence, a high accuracy and reliability in the exposure setting is insured.

As shown in the illustrated embodiment of the invention, the adjusted positions of the measuring device coil 17 are made to effect a proper positioning of the speed setting ring 3, through the medium of a two-armed control member or lever 30 which is pivotally carried by a spindle 29 on the frame part 14a of the frame 14 of the measuring device. The lever 30 has one arm 30a which is coupled to the tracing arm 21 by means of a pin-and-slot connection comprising a pin 31 and a slot 21d disposed respectively on the arm 30a and the arm 21a, FIGS. 2 and 3. The above-mentioned wire spring 28 is carried on the spindle 29 which mounts the control member or lever 30, and one end of the spring engages a fixed pin 32 whereas the other end engages the pin 33 carried by the arm 30a. Thus, the control member or lever 30 is biased in a counterclockwise direction by the spring 28 and this tends to turn the lever 21 clockwise by virtue of the pin-and-slot connection existing between the two levers. Thus, the arm 21a, or more properly the projection 21b of the arm 21a may be brought into engagement with the cam part 19 by means of the spring 28 when the levers 30 and 21 are free to move. The remaining arm 30b of the control lever 30 is adapted to cooperate with a step-type cam edge 3c provided on the speed setting ring 3. For this purpose the arm 30b is provided with a bent lug 30c at its extremity, which lug is engageable with various steps or shoulders of the stepped edge 3c. Such engagement is abutting in its nature, and acts to halt the speed setting ring 3 in any one of different adjusted positions as it is turned clockwise from the starting position shown in FIG. 1. The amount of movement which is permitted the speed setting ring 3 depends on the angular position of the lever arm 30b, which in turn is positioned by its engagement with the tracing lever 21. Thus, the angular position of the arm 30b is determined by the adjusted rotative position of the coil 17 and movable part of the measuring device 13. In other words, after the light conditions have been scanned by the photoelement and the current therefrom has effected an adjustment of the movable part including the coil 17 of the measuring device 13, then the lever arm 30b will be disposed in a predetermined adjusted angular position, whereupon as the setting ring 3 is turned clockwise it is brought to a halt by engagement of the lug 30c on the arm 30b with one of the steps or shoulders of the stepped edge 3c on the ring.

The operation and function of a camera constructed in accordance with the present invention, is as follows:

In order to set a new speed-diaphragm proportion, the exposure or speed setting ring 3 must be moved back from its existing adjusted position into the starting position shown in FIG. 1. This may be accomplished by pressing inward the button or plunger 11 which actuates the lever 7 in a counter clockwise direction to shift the pin 10 out of engagement with the teeth 3a. The ring 3 is by this act released, and under the action of the coil spring 4 it moves counterclockwise to the position of FIG. 1. When the ring 3 is in such position the stop or shoulder 3b thereof engages the pin 23 of the tracing lever 21, shifting such lever counterclockwise and shifting the brake lever 20 clockwise to the disengaged positions of such levers, as shown in FIG. 3. That is, the levers 20 and 21 are disengaged respectively from the brake part 18 and cam part 19 of the movable coil or movable part of the measuring device 13. Such movable part and coil are therefore free to respond in a sensitive manner to the current supplied by the photoelectric element as it is exposed to the actual light conditions.

The coil 17 and the cam and brake parts 19 and 18 will now assume a certain predetermined rotative position, constituting a definite adjustment as determined by the intensity of the light on the subject. The setting ring 3 is now moved clockwise against the action of the spring 4, as by grasping and shifting the handle 3d of the ring. At the beginning of such clockwise turning the shoulder or stop 3b will become disengaged from the pin 23, freeing the levers 20 and 21. Referring now to FIG. 3 it will be seen that as the said levers are freed by disengagement of the pin 23, the brake lever 20 in traveling a short distance will quickly become engaged with the brake part 18, and this will occur prior to the cam follower lever 21 becoming engaged with the cam 19 since such lever 21 first moves with the brake lever but has a greater or additional distance to move in effecting its engagement with the cam part. The engagement of the brake lever 20 with the brake part 18 will fix or lock the movable coil 17 in its adjusted position. Now, as the lever 21 is brought up against the cam part 19 it will position the transmission lever 30 in a certain setting, by virtue of the pin-and-slot connection between these two levers. This angular setting of the transmission lever 30 thus corresponds to the light conditions existing at the subject. Now, as the setting ring 3 is turned clockwise further by the handle 3d, it will proceed to a point where it is halted by engagement of the lug 30c on the transmission lever 30 with one of the steps or shoulders of the stepped edge 3c of the setting ring 3. Thus, the proper setting of the ring 3 has been determined in accordance with the existing light conditions.

As already mentioned above, the setting ring 3, depending on the purposes of the shutter construction, may be either a diaphragm setting ring, or else a speed setting ring, or a ring which sets the speed-diaphragm proportion.

In order to take into consideration other exposure factors, especially those different from shutter speed, diaphragm, or speed-diaphragm proportion, a simple means may be provided by which the stepped edge 3c may be adjustably positioned with respect to the setting ring 3 which carries the said edge.

I claim:

1. In a photographic camera, in combination, an electrical measuring device having a movable part adapted to be actuated by the current of a photo cell, said part having a cam surface and a separate brake surface; a pair of levers engageable respectively with said cam and brake surfaces and separable therefrom to permit free movement of said movable part, said cam surface and associated lever constituting a cam and cam follower device and said other lever and brake surface comprising a brake to hold the said movable part in any of its adjusted positions; means coupling said levers to each other for concurrent movement, said means causing the lever associated with the brake surface to engage the latter prior to engagement of the cam follower lever with the cam surface as the levers are concurrently moved in a direction to effect engagement; and a control member engageable with an exposure adjustment of the camera, connected to one of said levers for movement therewith, so as to control the camera adjustment as determined by the measuring device.

2. The invention as defined in claim 1, in which the means coupling the levers to each other includes an abutting connection having a pair of engageable surfaces, and includes spring means tending to hold said surfaces in engagement with each other.

3. The invention as defined in claim 2, in which the said spring means acts on the one lever which is associated with the said brake surface, said spring means also tending to bring such lever in engagement with the brake surface, and in which there is an additional spring means adapted to bring the cam follower lever, which is associated with the cam surface, into engagement with such cam surface.

4. The invention as defined in claim 3, in which the said levers are both two-armed levers, one arm of each lever being engageable with the said surface associated with such lever, whereas the remaining arms of the levers are included in the said means which couples the levers to each other for concurrent movement.

5. The invention as defined in claim 1, in which the said brake surface is in the form of a segment of a cylinder and has an axis coinciding with the axis of turning of the said movable part.

6. The invention as defined in claim 1, in which the lever associated with the brake surface has a contact surface engageable with such brake surface, one of said surfaces having means providing increased friction, thereby to increase the braking action when the lever and brake surface are engaged with each other.

7. The invention as defined in claim 6, in which the surface having the means providing increased friction is rough in nature.

References Cited in the file of this patent

UNITED STATES PATENTS

| | | |
|---|---|---|
| 240,329 | O'Neill | Apr. 19, 1881 |
| 1,619,039 | Richards | Mar. 1, 1927 |
| 1,979,644 | Saito | Nov. 6, 1934 |
| 2,147,939 | Tishken | Feb. 21, 1939 |
| 2,492,009 | Sandin et al. | Dec. 20, 1949 |
| 2,809,720 | Reid | Oct. 15, 1957 |